United States Patent
Rohrbach et al.

(10) Patent No.: US 7,410,585 B2
(45) Date of Patent: Aug. 12, 2008

(54) APPARATUS AND METHOD FOR STORING AND RELEASING SULFUR CONTAINING AROMATIC COMPOUNDS FROM A FUEL STREAM OF AN INTERNAL COMBUSTION ENGINE

(75) Inventors: Ronald P. Rohrbach, Flemington, NJ (US); Peter D. Unger, Convent Station, NJ (US); Gary B. Zulauf, Findlay, OH (US); Daniel E. Bause, Flanders, NJ (US); Russ Johnson, Elmhurst, IL (US); David R. Rockwell, Waterville, OH (US)

(73) Assignee: Honeywell International Inc., Morristown, NJ (US)

( * ) Notice: Subject to any disclaimer, the term of this patent is extended or adjusted under 35 U.S.C. 154(b) by 520 days.

(21) Appl. No.: 11/081,796

(22) Filed: Mar. 15, 2005

(65) Prior Publication Data

US 2005/0236334 A1    Oct. 27, 2005

Related U.S. Application Data

(60) Provisional application No. 60/553,225, filed on Mar. 15, 2004.

(51) Int. Cl.
*B01D 11/00* (2006.01)
*B01D 61/00* (2006.01)
*B01J 8/02* (2006.01)
*F02M 37/00* (2006.01)

(52) U.S. Cl. .............. 210/633; 210/634; 210/644; 210/648; 210/649; 210/650; 210/651; 210/660; 422/211; 422/212; 123/434

(58) Field of Classification Search ............. 422/170, 422/171, 211, 212, 213, 218, 222, 236, 238, 422/239; 210/633, 634, 644, 648, 649, 650, 210/651, 660, 670, 671, 672, 673, 679, 681; 123/434; 423/23, 25, 42, 45, 47, 50, 52, 423/55, 57, 101, 106, 110, 122, 125, 128
See application file for complete search history.

(56) References Cited

U.S. PATENT DOCUMENTS 4,919,103 A * 4/1990 Ishiguro et al. ............. 123/514

(Continued)

FOREIGN PATENT DOCUMENTS

WO      WO 00/20531      4/2000

OTHER PUBLICATIONS

PCT Search Report, PCT/US2005/008654, mailed Aug. 26, 2005.
International search report for PCT/US2005/008654 (2 pp.) dated Aug. 19, 2005.

*Primary Examiner*—Walter D. Griffin
*Assistant Examiner*—Huy-Tram Nguyen

(57) ABSTRACT

Disclosed is a fuel filter for removing sulfur containing compounds from an internal combustion fuel stream. In one embodiment, the fuel filter comprises at least one column comprising an adsorbent. In one exemplary embodiment the adsorbent is capable of removing sulfur containing compounds, especially sulfur containing aromatic compounds, from fuels used in internal combustion engines, especially diesel fuels. Also disclosed is an apparatus for extending the life cycle of a post combustion emission control device. In one exemplary embodiment, the apparatus comprises a fuel filter for removing sulfur containing compounds from an internal combustion fuel stream and an emission control device. Finally, a method for removing sulfur containing compounds from an internal combustion fuel stream is disclosed. In one exemplary embodiment, the method comprises passing a fuel through a fuel filter capable of removing sulfur containing compounds, storing the removed sulfur containing compounds, releasing a portion of the stored sulfur containing compounds, and sending the portion through the engine and into an emission control device.

20 Claims, 11 Drawing Sheets

U.S. PATENT DOCUMENTS

| | | | |
|---|---|---|---|
| 5,094,747 A * | 3/1992 | Johnson | 210/266 |
| 5,460,136 A * | 10/1995 | Yamazaki et al. | 123/519 |
| 5,472,673 A * | 12/1995 | Goto et al. | 422/169 |
| 5,792,436 A * | 8/1998 | Feeley et al. | 423/210 |
| 6,129,835 A * | 10/2000 | Lesieur et al. | 208/208 R |
| 6,749,754 B1 * | 6/2004 | Holder et al. | 210/601 |
| 6,756,022 B2 | 6/2004 | Sakai et al. | 422/189 |
| 2001/0047653 A1 | 12/2001 | Tatsuji et al. | 60/274 |
| 2002/0028505 A1 * | 3/2002 | Sakai et al. | 435/299.1 |
| 2002/0103078 A1 * | 8/2002 | Hu et al. | 502/326 |
| 2002/0128146 A1 * | 9/2002 | Druckhammer et al. | 502/20 |
| 2003/0070990 A1 * | 4/2003 | Rohrbach et al. | 210/668 |
| 2003/0113249 A1 * | 6/2003 | Hepburn et al. | 423/242.1 |
| 2004/0091753 A1 * | 5/2004 | Terorde et al. | 429/12 |
| 2005/0169826 A1 * | 8/2005 | Li et al. | 423/244.06 |

* cited by examiner (i)

(ii)

(i)

(ii)

APPARATUS AND METHOD FOR STORING AND RELEASING SULFUR CONTAINING AROMATIC COMPOUNDS FROM A FUEL STREAM OF AN INTERNAL COMBUSTION ENGINE

CROSS REFERENCE TO RELATED APPLICATIONS

This application claims the benefit of U.S. Provisional Patent Application Ser. No. 60/553,225 filed Mar. 15, 2004, the contents of which are incorporated herein by reference thereto.

STATEMENT REGARDING FEDERALLY SPONSORED RESEARCH OR DEVELOPMENT

Embodiments of this invention may have been made with governmental support under Contract No. DE-FC26-02NT41219. Therefore, the U.S. Government may have a paid-up license to portions or embodiments of this invention and the right in limited circumstances to require the patent owner to license to others on reasonable terms as provided for by the terms of, Contract No. DE-FC26-02NT41219.

TECHNICAL FIELD

The present invention relates to a fuel filter, apparatus, and method for the reduction, manipulation and/or distribution of sulfur containing compounds in an internal combustion engine fuel stream. More particularly, the disclosed inventions enhance the ability of post combustion emission devices to reduce nitrogen oxide emissions from internal combustion engines, especially motor vehicle engines.

BACKGROUND

Nitrogen oxide or 'NOx' adsorbers are used to remove nitrogen oxides from the exhaust streams of both mobile and stationary internal combustion engines. However, the efficiency of such NOx adsorbers is reduced in the presence of sulfur containing compounds. Such sulfur containing compounds, especially sulfur containing aromatic compounds, 'poison' or react 'irreversibly' with the catalysts of NOx adsorbers. NOx adsorbers having contaminated catalysts have reduced efficiency. As a result, the presence of sulfur containing compounds in fuels used in internal combustion engines can have a deleterious effect upon exhaust emissions, especially with respect to nitrous oxide emissions. This problem is of particular concern in motor vehicles and stationary systems employing diesel engines.

The catalysts in NOx adsorbers typically undergo regenerative processes designed to extend the life expectancy of the catalyst/NOx adsorber. A first type of regenerative process is designed to drive off the NOx in the form of nitrogen from the NOx adsorber. In a second type of regenerative process, contaminants such as sulfur containing compounds are released or removed. The later process is sometimes referred to as desulfation and typically occurs at higher temperatures then the NOx regeneration process. Repeated exposure to such high temperatures can adversely affect catalyst life expectancy.

The concentration of sulfur containing compounds present in the fuel stream directly impacts how often a NOx adsorber must undergo desulfation. The higher the concentration, the more often the catalyst of a NOx adsorber must undergo desulfation. Similarly, a NOx adsorber will have a shorter life expectancy the more often it undergoes desulfation.

It would thus be advantageous to provide a fuel filter capable of minimizing the adverse effect of sulfur contaminants on the NOX adsorber.

The prior art has attempted to provide devices that remove sulfur-containing fuels from internal combustion engine fuel streams. For example, U.S. Patent Application Publication No. U.S. 2002/0028505 A1, the contents of which are incorporated herein by reference thereto discloses a desulfation apparatus to be mounted in automobiles, which is arranged between a fuel tank and an injector of an engine, the apparatus comprising a combination of a sulfur-containing compound adsorbent for adsorbing and concentrating the sulfur-containing compound and a sulfur-containing compound oxidizing agent or oxidation catalyst for oxidizing the adsorbed sulfur-containing compound, the apparatus further comprising a means for recovering and removing the resulting sulfur-containing oxide.

However, there remains a need for devices, especially fuel filters, that could reduce the amount of sulfur containing compounds in an internal combustion fuel stream to a desirable concentration, especially to concentrations of 3 ppm or less.

It would also be advantageous if such a fuel filter could be regenerated, that is, could distribute some or all of the stored sulfur containing compounds in order to extend the life cycle or capacity of the fuel filter. It would be particularly advantageous if such regeneration could occur without imposing a deleterious effect upon the NOx adsorber or upon engine exhaust emissions. It would also be desirable if such a fuel filter could thus extend the life cycle of NOx adsorbers by reducing the frequency of desulfation.

SUMMARY OF THE INVENTION

In one embodiment, a fuel filter is disclosed for removing sulfur containing compounds from an internal combustion fuel stream, the fuel filter comprising at least one column comprising an adsorbent. In one exemplary embodiment the adsorbent is capable of removing sulfur containing compounds, especially sulfur containing aromatic compounds, from fuels used in internal combustion engines, especially diesel fuels.

Also disclosed is an apparatus for extending the life cycle of a post combustion emission control device. In one exemplary embodiment, the apparatus comprises a fuel filter for removing sulfur containing compounds from an internal combustion fuel stream, an internal combustion engine, a post combustion emission control device, and hollow conduit connecting the filter, the engine and the emission control device.

A sulfur removing filter capable of removing, storing and releasing sulfur-containing compounds, wherein the filter is capable of distributing some or all of the stored sulfur containing compounds during a regeneration cycle of an emission control device wherein release of the sulfur contain compounds occurs during regeneration and occurs without imposing a deleterious effect upon the NOx adsorber or upon engine exhaust emissions.

A system for extending the time periods between regeneration cycles of an emission control device, the system comprising: a fuel filter for removing, storing and releasing sulfur containing compounds from a fuel stream; an internal combustion engine in fluid communication with the fuel system and the fuel filter; an emission control device in fluid communication with an exhaust stream of the internal combustion engine; and a means for controlling the release of the stored sulfur containing compounds.

Finally, a method for removing sulfur containing compounds from an internal combustion fuel stream is disclosed. In one exemplary embodiment, the method comprises passing a fuel through a fuel filter capable of removing sulfur containing compounds, storing the removed sulfur containing compounds, releasing a portion of the stored sulfur containing compounds, and sending the released portion through the engine and into a post combustion emission control device.

DETAILED DESCRIPTION OF EXEMPLARY EMBODIMENTS

Figure 1:
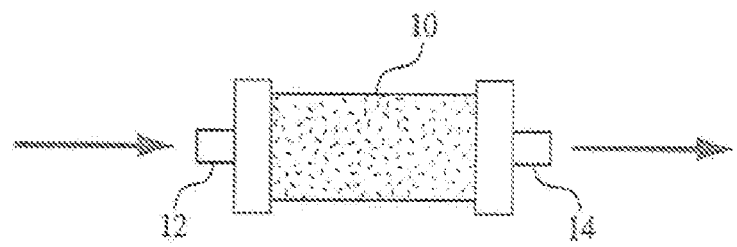
FIG. 1 provides a schematic illustration of one embodiment of the disclosed fuel filter comprising a single column.

Disclosed is a fuel filter which is capable of removing a sulfur containing compound from the fuel stream of an internal combustion engine to a concentration of equal to or less than 3 ppm and storing the removed sulfur containing compound. The filter is capable of regeneration because at least a portion of the stored sulfur-containing compound is released when the storage capacity of the filter is reduced. As used herein fuel filter is intended to describe a fuel filter designed to remove and thereafter release sulfur-containing compounds found in fuels. It is understood than in accordance with exemplary embodiments a separate fuel filter is provided to remove contaminants from the fuel (e.g., a typical or non-sulfur removing fuel filter). Alternatively, a single fuel filter configured for both removal and release of sulfur-containing compounds and filtering of other contaminants is contemplated to be within the scope of alternative embodiments of the present invention. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. The modifier "about" used in connection with a quantity is inclusive of the stated value and has the meaning dictated by the context (e.g., includes the degree of error associated with measurement of the particular quantity).

The disclosed fuel filter can be used with internal combustion engines employed in both stationary systems and motor vehicles. Illustrative examples of stationary systems include generators and power plants. Illustrative examples of motor vehicles include cars, trucks, boats, personal water craft, semi-trucks, construction devices such as bulldozers and cranes, small engine devices such as lawn mowers and tractors, and the like, wherein the sulfur removing fuel filter is part of an on-board system. An exemplary embodiment is a vehicular application wherein the sulfur removing filter is part of an emission control system wherein the filter releases captured sulfur containing compounds into the fuel stream during a regeneration process of a NOx adsorber, wherein the regeneration of the NOx adsorber is conducted in accordance with technologies known to those skilled in the related arts.

Suitable internal combustion engines may be powered by any suitable organic fuel. In one embodiment, the fuel will be gasoline or diesel fuel. In one exemplary embodiment, the fuel will be diesel fuel.

The sulfur containing compounds removed by the disclosed fuel filter may in general be any sulfur containing compound normally found in fuels intended for use in internal combustion engines. In one exemplary embodiment, the sulfur-containing compound removed by the disclosed filter will be a sulfur containing aromatic compound. Illustrative sulfur containing compounds removed by the disclosed fuel filter include benzothiophene, dibenzothiophene, and derivatives thereof. The disclosed fuel filters may remove one or more of such compounds from a fuel stream.

The disclosed fuel filter and method may be used with commercially available fuels, either 'high' sulfur fuels or 'low' sulfur fuels. In one embodiment, unfiltered fuel streams may comprise sulfur concentrations of from about 6 ppm to 500 ppm. In another embodiment, the disclosed filters and method may be used with unfiltered fuel streams having sulfur concentrations of from about 15 ppm or less. In one exemplary embodiment, the disclosed filters and method may be used with unfiltered fuel streams having sulfur concentrations of from about 9 ppm or less. In one embodiment, the disclosed filters and method may be used with unfiltered fuel streams having sulfur concentrations of from about 6 ppm to about 15 ppm.

In one embodiment, the disclosed method will result in filtered fuel streams having a reduced concentration of sulfur; especially sulfur concentrations of 3 ppm or less.

In one exemplary embodiment, the fuel filter will comprise at least one column comprising an adsorbent. As illustrated in FIG. 1, at least one column 10 will have a first opening 10 through which unfiltered fuel will enter the column 10 and a second opening 14 through which filtered fuel will exit the column 10. During the normal operation of the fuel filter, the concentration of a sulfur-containing compound in the fuel exiting the opening 14 will be less than the concentration of the sulfur-containing compound in the fuel entering the opening 12.

Illustrative adsorbents include one or more activated carbon, zeolites, clay, acid clay, active clay, silica gel, silicon dioxide, alumina, aluminum oxide, mesoporous silica porous material (FSM), mixtures thereof, and the like. In one embodiment, the adsorbent will comprise at least one of alumina or aluminum oxide. In one exemplary embodiment, the adsorbent will consist of alumina.

Figure 2:
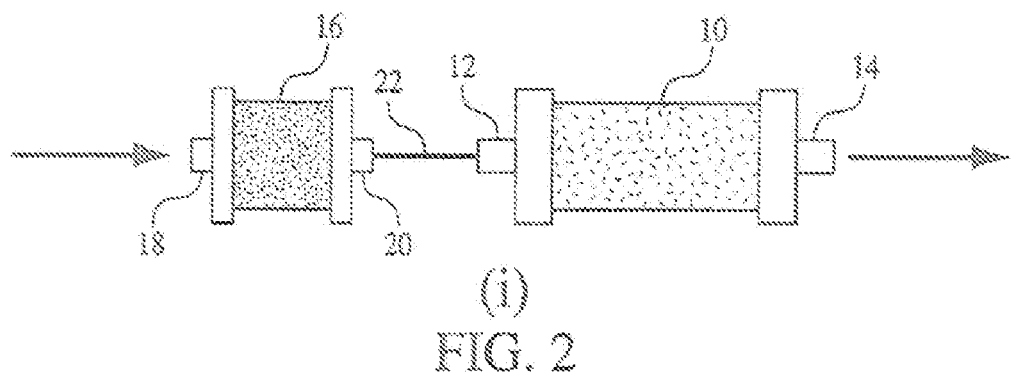
FIG. 2 illustrates another embodiment of the disclosed fuel filter comprising a single column with a guard bed.
Figure 3:
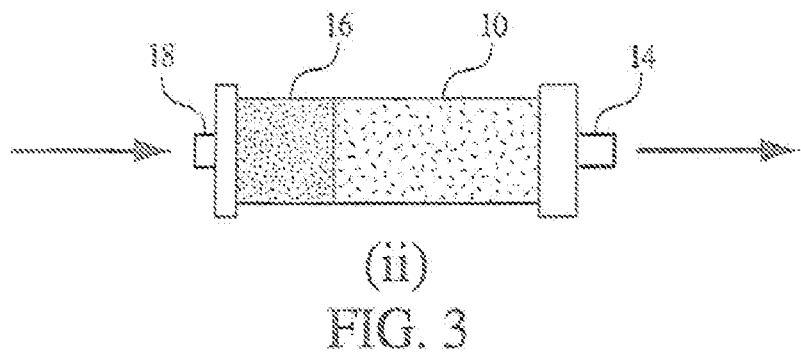
FIG. 3 illustrates an alternative embodiment of the disclosed fuel filter of FIG. 2 comprising a single column with a guard bed.

In another exemplary embodiment, the disclosed fuel filter will further comprise at least one guard bed 16 as illustrated in either FIG. 2 or FIG. 3.

As illustrated in FIG. 2, the at least one guard bed 16 may have a first opening 18 through which fuel enters the guard bed, and a second opening 20 though which fuel exits the guard bed. In this embodiment, the guard bed 16 will connected to the at least one column 10 via a hollow conduit 22 through which fuel may pass and be transferred.

Alternatively, in another embodiment as illustrated in FIG. 3, the at least one guard bed 16 may be contiguously attached to column 10 such that fuel enters through a first opening 16, passes through both the guard bed 16 and the column 10, and subsequently exits through the second opening 14 of column 10.

Figure 4:
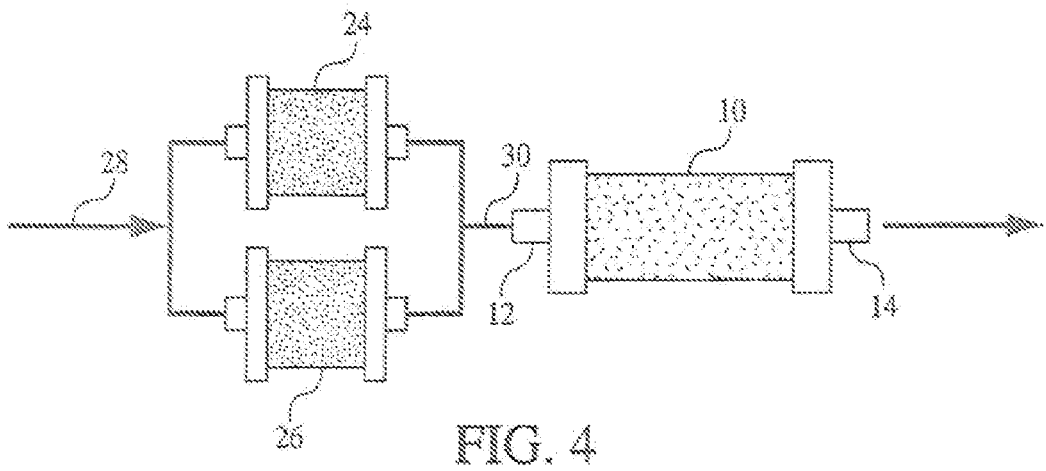
FIG. 4 provides a schematic illustration of another embodiment of the disclosed fuel filter comprising a single column with dual guard beds.

In another embodiment illustrated in FIG. 4, the disclosed fuel filter may comprise at least one column 10 that is linked to two guard beds 24 and 26 via conduits 28 and 30. In this embodiment, the incoming fuel may enter one or both of the guard beds 24 and 26. After exiting from one or both of guard beds 24 and 26, the fuel will be transferred to column 10 via conduit 30. In this embodiment, the fuel entering the column 10 will pass through first opening 12 and exit column 10 via second opening 14.

Figure 5:
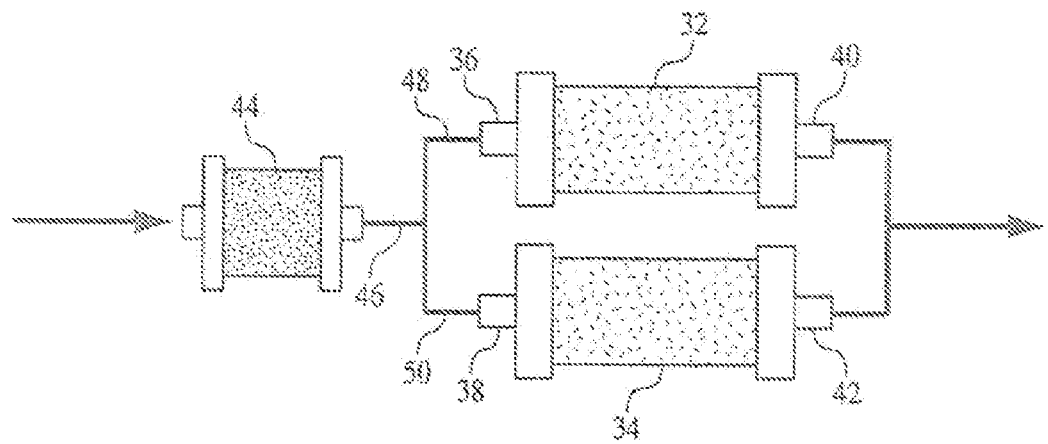
FIG. 5 provides a schematic illustration of yet another embodiment of the disclosed fuel filter comprising dual columns with a single guard bed.

In another embodiment illustrated in FIG. 5, the fuel filter may comprise dual columns 32 and 34 and a single guard bed 44. Dual columns 32 and 34 respectively have first openings 36 and 38 through which fuel may enter, and second openings 40 and 42 through which fuel may exit. Single guard bed 44 is connected to dual columns 32 and 34 via conduit 46. Conduit 46 in one embodiment will have conduits 48 and 50 arrayed such that fuel may enter one or both of columns 32 and 34, either sequentially or simultaneously.

Figure 6:
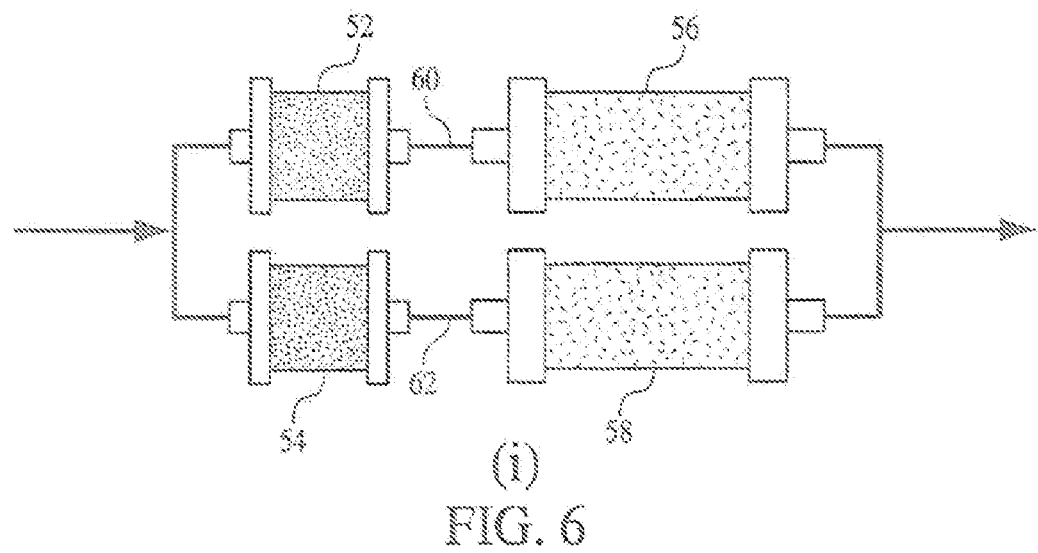
FIG. 6 provides a schematic illustration of another embodiment of the disclosed fuel filter comprising dual columns with dual guard beds.
Figure 7:
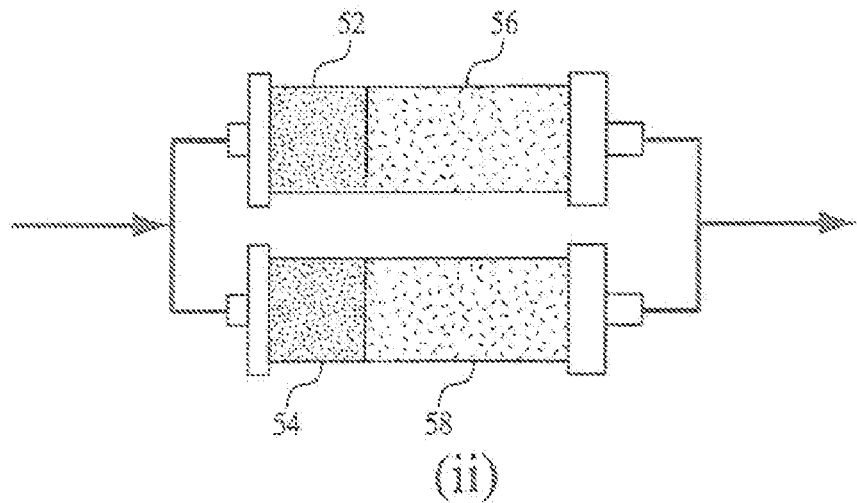
FIG. 7 illustrates an alternative embodiment of the disclosed fuel filter of FIG. 6 comprising dual columns with dual guard beds.

Finally, as illustrated in FIGS. 6 and 7, the disclosed fuel filter may comprise two guard beds 52 and 54 and two columns 56 and 58. As discussed above with regard to the embodiment of FIG. 2, the guard beds 52 and 54 may be respectively connected to columns 56 and 58 via conduits 60 and 62. Alternatively, the guard beds 52 and 54 may be directly attached to columns 56 and 58 without the use of any hollow conduits. As discussed above with regard to FIGS. 4 and 5, the fuel may enter one or both of the guard beds 52 and 54 as well as one or both of columns 56 and 58.

In addition to the disclosed fuel filter, the invention also provides a method for removing a sulfur-containing compound from an internal combustion fuel stream. The disclosed method comprises removing a sulfur containing compound from a fuel by passing the fuel through a fuel filter capable of removing a sulfur containing compound, storing the removed sulfur containing compound, releasing a portion of the stored sulfur-containing compound, and sending the portion to an emission control device.

A sulfur-containing compound is removed from a fuel stream as the fuel is passed through the disclosed fuel filter. In one exemplary embodiment, the sulfur-containing compound is removed as the fuel is passed through at least one column comprising an adsorbent as discussed above.

The sulfur-containing compound removed from a fuel stream by the disclosed fuel filter will be stored by the fuel filter. In one exemplary embodiment, the removed sulfur containing compound will be stored in the at least one column comprising the adsorbent. In one especially exemplary embodiment, the removed sulfur-containing compound will be stored in the adsorbent.

Figure 18:
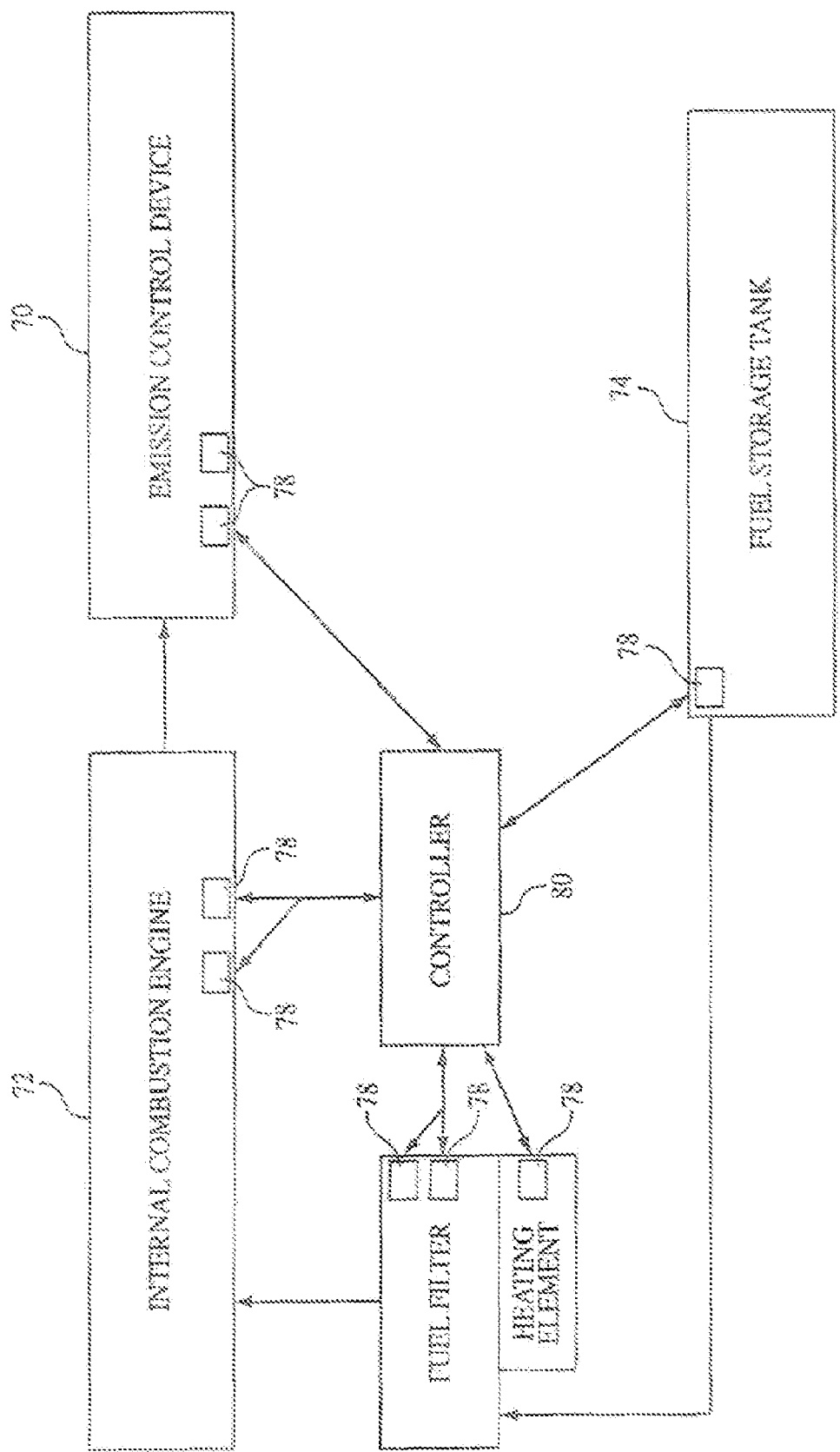
FIG. 18 is a schematic illustration of an internal combustion engine and NOx adsorber with a fuel filter according to exemplary embodiments of the present invention.

It will be appreciated that over the life of an internal combustion engine the disclosed fuel filter will remove a quantity of sulfur containing compounds. At some point, the adsorbent may become incapable of storing any additional sulfur-containing compound even though additional storage is desired. At such a point, the disclosed fuel filter may be regenerated. Non-limiting examples of determining when the fuel filter has become saturated with sulfur-containing compounds are: measuring via sensors the sulfur content of the fuel before and after the fuel filter wherein sulfur measurement equal to or close to those of measurement entering the filter will indicate that the filter is no longer removing sulfur from the fuel; providing sensors to determine how much sulfur the engine is putting out in the exhaust stream; providing sensors in the fuel storage tank to determine the base line in parts per million of the sulfur in the fuel of the vehicle; and providing pressure sensors before and after the fuel filter, wherein any of the aforementioned methods are facilitated through the microprocessor or controller and various sensors communicating therewith as illustrated in FIG. 18. Regeneration of the fuel filter as used herein refers to the release of at least a portion of the stored sulfur-containing compound. Such release or regeneration may be accomplished by one or more methods.

In one exemplary embodiment, the regeneration of the fuel filter may be accomplished by heating the fuel filter to an elevated temperature. In one embodiment, at least one column of the fuel filter will be heated by a heating element (illustrated in FIG. 18) wherein either the adsorbent member of the fuel filter, the fuel or both are heated to a temperature that is greater than the highest normal operating temperature of the fuel stream, wherein the captured sulfur containing compounds will be released into the fuel stream. In one exemplary embodiment, the heating element is a resistive type heating element wherein an applied current or voltage from a power supply is used to increase the temperature of the fuel or the adsorbent material in order to release the captured sulfur containing compounds. Of course, other equivalent heating devices are contemplated for use in exemplary embodiments of the present invention. In one exemplary embodiment, at least one column of the fuel filter will be heated to a temperature that is equal to or greater than about 100° C. In another embodiment, the at least one column of the fuel filter will be heated to a temperature that is equal to or below the boiling point of the fuel.

In another embodiment, the fuel filter may be regenerated by the use of a heated fuel stream or by displacement by a solvent other than the fuel, wherein the solvent is released from a solvent reservoir in fluid communication with the fuel stream and is capable of releasing the captured sulfur containing compounds from the adsorbent member. In one exemplary embodiment the solvent is released from the reservoir and then recaptured by a suitable filter or alternatively the solvent is a material capable of being consumed by the internal combustion engine without damaging the same or the associated emission control devices.

The portion of the stored sulfur-containing compound released by the regeneration of the fuel filter is sent through an internal combustion engine and into an emission control device, especially a post-combustion emission control device. Emission control device as used herein refers to nitrogen oxide or 'NOx' adsorbers used to remove nitrogen oxides from the exhaust streams of both mobile and stationary internal combustion engines. In one embodiment, the emission control device will be a Lean NOx Trap or LNT. 'Post-combustion' refers to a device positioned to receive the products of combustion from an internal combustion engine, i.e., located downstream from the internal combustion engine.

In one exemplary embodiment, the released portion will be sent through the engine and into the emission control device so that it enters the emission control device at a time or operation in the device's operational cycle when the effect of the increased concentration of sulfur is minimized. A non-limiting example of such a time or operation is illustrated in the enclosed Example and Figures.

In another embodiment, the portion may be sent through the engine and into a post combustion emission device such as a NOx adsorber at a time during its cycle that is less sensitive to high sulfur levels. A non-limiting example of such a time or operation is illustrated in the enclosed Example and Figures. In a more preferred embodiment, the portion of sulfur containing compound released by the regeneration of the disclosed fuel filter will be sent to a NOx adsorber at a time when the NOx adsorber and/or NOx adsorber catalyst is undergoing a regenerative process either for NOx or desulfation.

The catalysts in NOx adsorbers typically undergo regenerative processes designed to increase the efficiency of the catalyst/NOx adsorber. A first type of regenerative process is designed to convert the nitrogen oxides to nitrogen. In a second type of regenerative process, contaminants such as sulfur containing compounds are driven off. The later process is sometimes referred to as desulfation and typically occurs at higher temperatures such as those illustrated in the attached Example. It is, of course, understood that exemplary embodiments of the present invention may include temperatures greater or less than those illustrated in the enclosed Example and Figures.

In one exemplary embodiment, the portion of the sulfur containing compound released by the regeneration of the disclosed fuel filter will be sent to a NOx adsorber at a time when the NOx adsorber and/or NOx adsorber catalyst is undergoing a regenerative process that results in the removal or release of nitrous oxides via reduction.

In another embodiment, the portion of the sulfur containing compound released by the regeneration of the disclosed fuel filter will be sent to a NOx adsorber at a time when the NOx adsorber and/or NOx adsorber catalyst is undergoing a regenerative process that results in the liberation of the sulfur containing compounds, i.e., desulfation.

In one exemplary embodiment the release of the portion and its sending to an emission control device will occur over a short period of time relative to the regeneration period of the fuel filter. In one exemplary embodiment, the regeneration period of the fuel filter approximates the regeneration period of the emission control device. In accordance with exemplary embodiments of the present invention, the regeneration period of the emission control device will be maximized as the fuel filter will reduce the amount of sulfur being deposited on the NOx adsorber thus, regeneration periods can be less frequent and at longer intervals.

Also disclosed herein is a method and apparatus for extending the life cycle of an emission control device 70 in fluid communication with the exhaust of an internal combustion engine 72. This apparatus or system includes the disclosed fuel filter for removing and storing sulfur-containing compounds from an internal combustion fuel stream is illustrated schematically in FIG. 18. As illustrated, the internal combustion engine receives fuel from a fuel storage tank 74 via the fuel filter. A non-limiting example of an apparatus, method or means for monitoring and controlling the release of stored sulfur containing compounds into the fuel stream is illustrated in FIG. 18.

In one embodiment, the emission control device is a post combustion emission control device that receives the gaseous products of combustion from the combustion chamber of the internal combustion engine.

In one exemplary embodiment, the apparatus, method or means for monitoring and controlling the release of stored sulfur containing compounds is an on-board control apparatus comprising a plurality of sensors 78 each providing signals to a microprocessor or controller 80 comprising programmable logic that is configured to receive signals from the plurality of sensors and provide signals to the fuel filter and its associated heater element, the internal combustion engine, fuel delivery and ignition systems to vary the air to fuel flow mixture, if necessary (e.g., lean or rich operation to increase exhaust temperature) and heater elements of the emission control device wherein and upon receipt of the appropriate signals (e.g., fuel filter sulfur capacity reached and emission control device operating in or at a desulfurization or regeneration mode) the microprocessor will instruct the release of the sulfur into the fuel stream wherein the same can be received by the emission control device without adversely affecting the same.

It is understood that a controller operating in response to a computer program may implement the processing of the above description. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

As described above, algorithms for implementing exemplary embodiments of the present invention can be embodied in the form of computer-implemented processes and apparatuses for practicing those processes. The algorithms can also be embodied in the form of computer program code containing instructions embodied in tangible media, such as floppy diskettes, CD-ROMs, hard drives, or any other computer-readable storage medium, wherein, when the computer program code is loaded into and executed by a computer and/or controller, the computer becomes an apparatus for practicing the invention. Existing systems having reprogrammable storage (e.g., flash memory) that can be updated to implement various aspects of command code, the algorithms can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer. When implemented on a general-purpose microprocessor, the computer program code segments configure the microprocessor to create specific logic circuits.

These instructions may reside, for example, in RAM of the computer or controller. Alternatively, the instructions may be contained on a data storage device with a computer readable medium, such as a computer diskette. Or, the instructions may be stored on a magnetic tape, conventional hard disk drive, electronic read-only memory, optical storage device, or other appropriate data storage device. In an illustrative embodiment of the invention, the computer-executable instructions may be lines of compiled C++ compatible code.

In an exemplary embodiment the controller includes logic for evaluating signals from the plurality of sensors to determine if the sulfur from the fuel filter is to be released into the fuel stream during a desulfurization or regeneration process of the emission control device. In one non-limiting embodiment, a means for controlling the release of the sulfur will comprise a circuit and sensor for identifying a predetermined temperature or pressure in either the engine or the emission control device that signals the appropriate time for release.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

EXAMPLE

The following test was performed to determine if purging stored sulfur from a fuel filter and injecting it into the engine just before or during desulfation of an LNT is detrimental to the life of the LNT. The theory is that during desulfation, the LNT is under a reducing condition and may be at elevated temperature so that the high sulfur concentration in the exhaust gas will not be retained in the LNT and thus will not be detrimental to the LNT.

A full size LNT catalyst from Johnson Matthey was hydrothermally oven aged at 700° C. for 24 hours. Two one-inch diameter by two-inch long cores were cut from the full size catalyst. One core was installed into a Universal Synthetic Gas Reactor™ (USGR™) from Southwest Research Institute (SwRI) of San Antonio, Tex. The catalyst was then tested following the test plan sequences given in Tables 1 and 2. The gas mixtures employed are set forth in Table 3.

TABLE 1

BASELINE LNT PERFORMANCE TEST SCHEDULE

| STEP | DESCRIPTION |
|---|---|
| 1 | Normal LNT operation for one hour. |
| 2 | Five-minute Desulfurization. |
| 3 | Normal LNT operation for one hour. |
| 4 | Five-minute Desulfurization. |
| 5 | LNT operation with 75 ppm $SO_2$ exposure for one hour. |
| 6 | Five-minute Desulfurization. |
| 7 | Normal LNT operation for one hour. |
| 8 | Five-minute Desulfurization. |
| 9 | Normal LNT operation for one hour. |
| 10 | Five-minute Desulfurization. |

Normal operation = 400° C., Desulfurization = 650° C.
Space Velocity = 40,000 $hr^{-1}$

TABLE 2

HIGH SULFUR EXPOSURE LNT PERFORMANCE TEST SCHEDULE

| STEP | DESCRIPTION |
|---|---|
| 1 | Normal LNT operation for one hour. |
| 2 | Fifteen-minute Desulfurization with 75 ppm $SO^2$ + one minute at 0.6 $SO_2$. (1) |
| 3 | Normal LNT operation for one hour. |
| 4 | Fifteen-minute Desulfurization with 75 ppm $SO_2$ + one minute at 0.6 $SO_2$. (2) |
| 5 | LNT operation with 75 ppm $SO_2$ exposure for one hour. |
| 6 | Fifteen-minute Desulfurization with 75 ppm $SO_2$ + one minute at 0.6 $SO_2$. (3) |
| 7 | Normal LNT operation for one hour. |
| 8 | Fifteen-minute Desulfurization with 75 ppm $SO_2$ + one minute at 0.6 $SO_2$. (4) |
| 9 | Normal LNT operation for one hour. |
| 10 | Fifteen-minute Desulfurization with 75 ppm $SO_2$ + one minute at 0.6 $SO_2$. (5) |

Normal operation = 400° C., Desulfurization = 650° C.
Space Velocity = 40,000 $hr^{-1}$

TABLE 3

GAS MIXTURES USED

| | CONCENTRATION | |
|---|---|---|
| GAS COMPONENT | LEAN | RICH |
| NO, ppm | 350 | 350 |
| $SO_2$, ppm | $0.6^a$ ($75^b$) | $0.6^a$ ($75^b$) |
| CO, ppm | 125 | ~6,700 |
| $H_2$, ppm | 0 | ~4,640 |
| $CO_2$, percent | 6 | 6 |
| $H_2O$, percent | 6 | 6 |
| $C_2H_4$, ppm | 60 | 60 |
| $O_2$, percent | 6 | 0 |
| $N_2$ | Balance | Balance |
| Calculated Air/Fuel Ratio | 24.51 | 13.67 |

[a] derived relative to NO concentration
[b] 75 ppm $SO_2$ used to simulate 1000 ppm sulfur fuel Fuel sulfur levels were simulated with $SO_2$ in the USGR gas stream. For a target 15 ppm fuel sulfur level, and an engine operating at an AFR of 25:1, the exhaust sulfur level was set to 0.6 ppm. The target exhaust gas $SO_2$ concentration was obtained by using a cylinder containing 10.3 ppm of $SO_2$ combined with 6006 ppm of NO. When the NO concentration was set to 350 ppm, the $SO_2$ was known to be 0.6 ppm. The concentrations for NO, CO, $CO_2$, $C_2H_4$, and $H_2O$ were set and measured using a Fourier Transform Infra-Red analyzer (FTIR). The $O_2$ concentration was set and measured using a standard Polarographic analyzer. A 23-second lean, 7-second rich cycle was adopted because it gave $NO_x$ conversion efficiencies closer to 90 percent with the aged LNT.

The first sequence of tests performed was the baseline sequence. In this sequence, low sulfur was used throughout, except for Step 5, where the LNT was exposed to 75 ppm $SO_2$ for one hour. The primary goals of the baseline test sequence were: (i) to determine if the LNT performance could be maintained within acceptable limits over several normal operation/desulfation cycles; (ii) to determine if LNT performance was negatively impacted by exposure to high sulfur over a one-hour period of otherwise normal operation; and (iii) to determine if LNT performance was effectively restored by the desulfation step after exposure to high sulfur.

Figure 8:
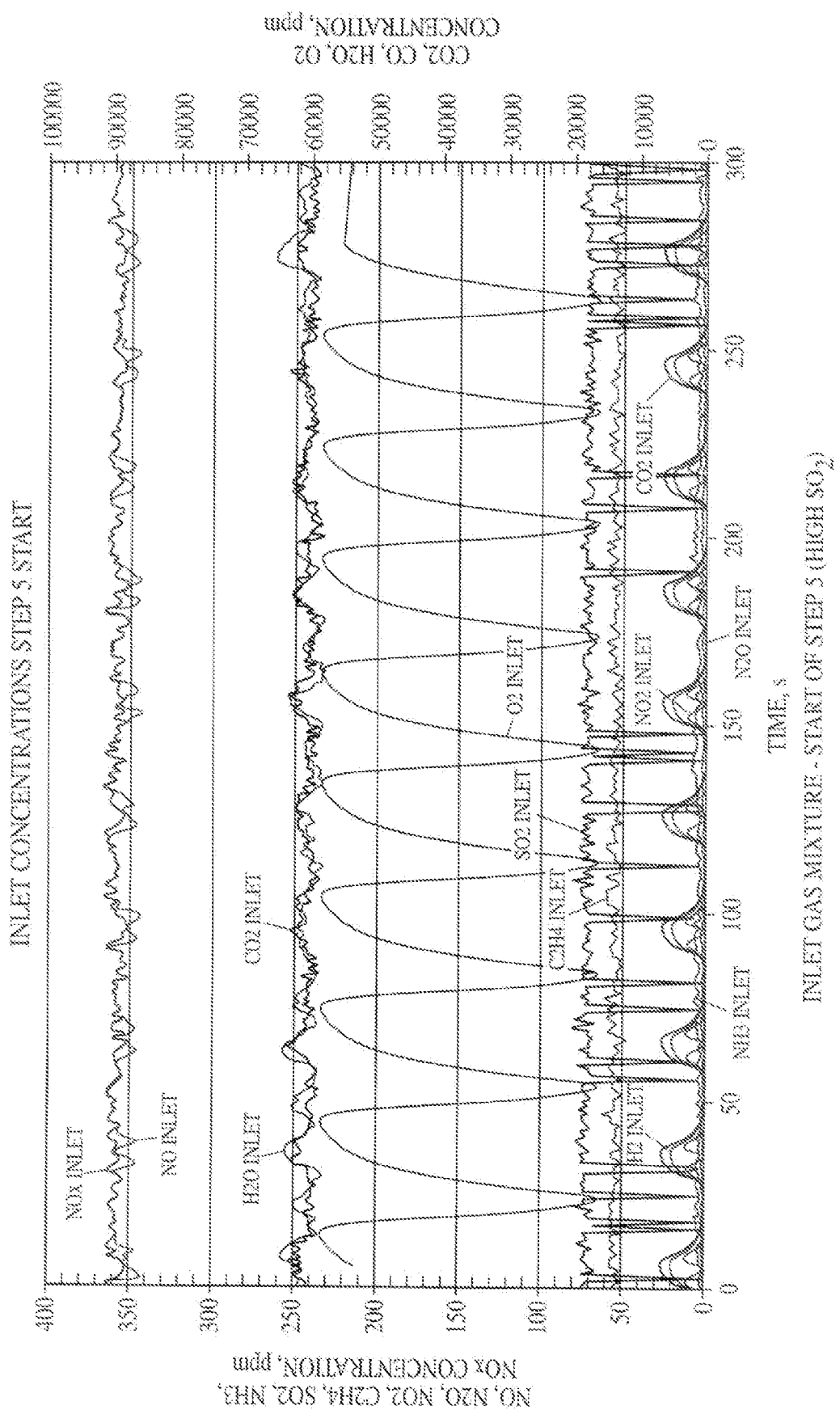
FIG. 8 is a graph illustrating inlet gas mixture at the start of Step 5.
Figure 9:
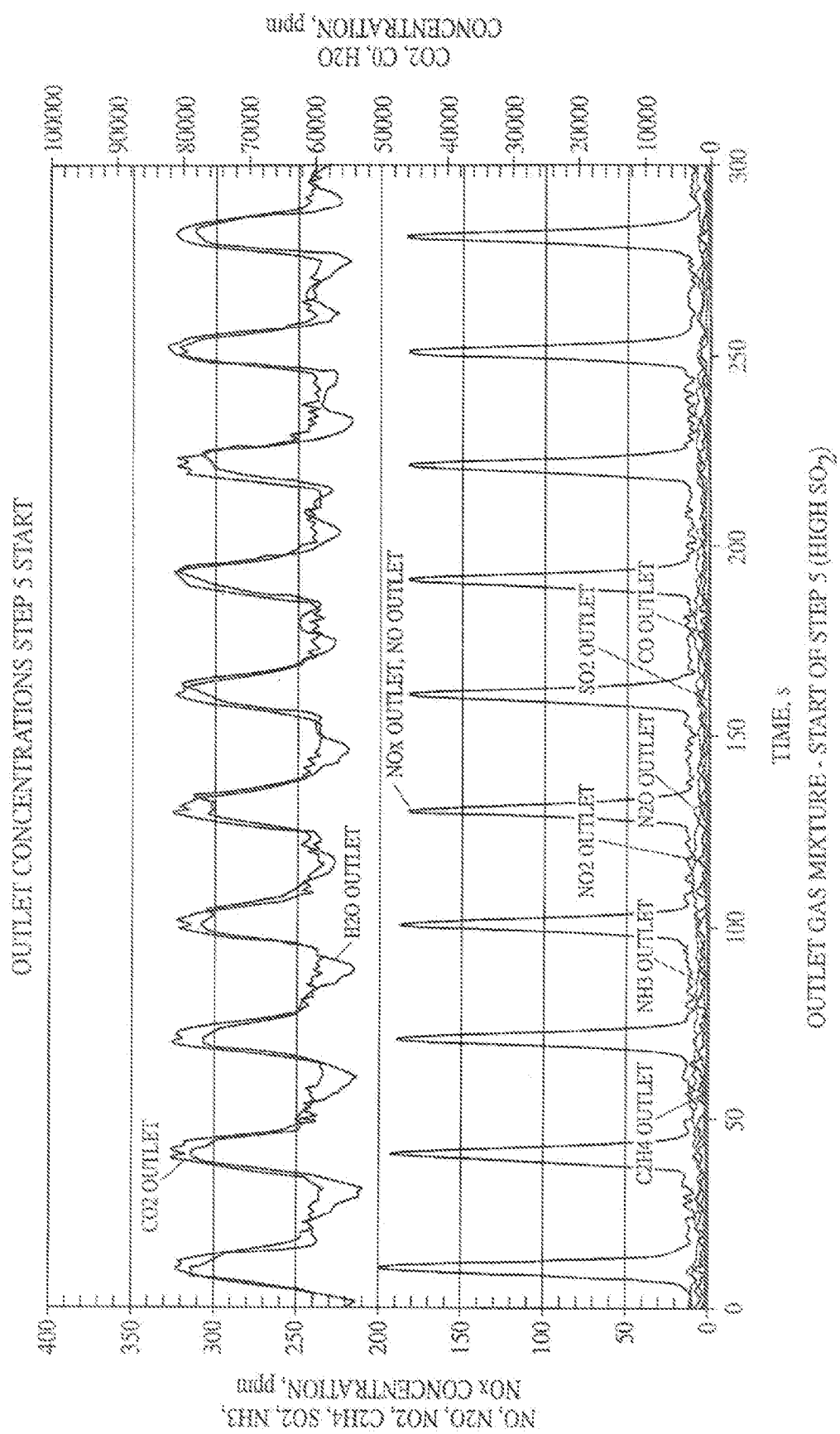
FIG. 9 is a graph illustrating outlet gas mixture at the start of Step 5.
Figure 10:
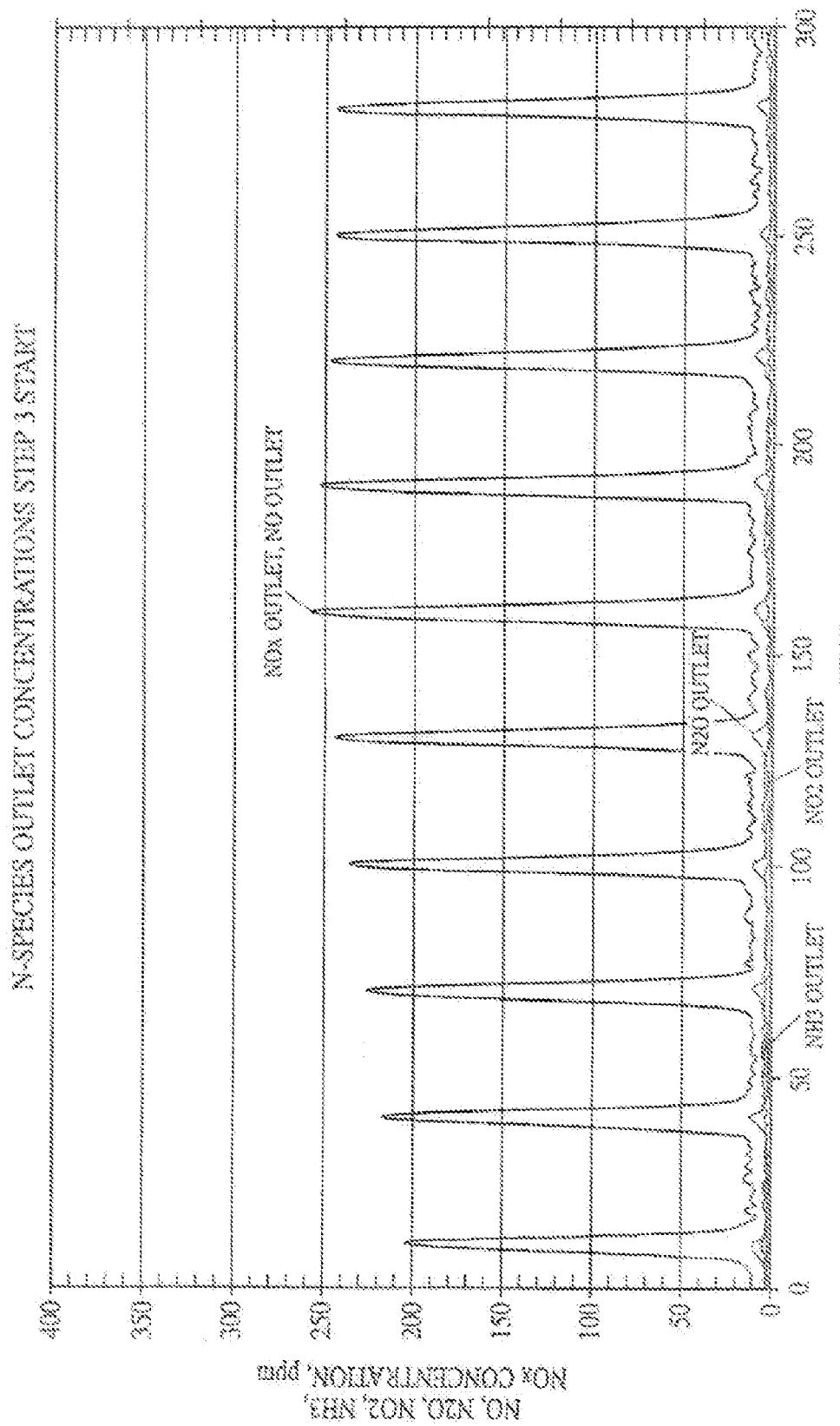
FIG. 10 is a graph illustrating Lean NOx Trap (LNT) activity at the start of Step 3.
Figure 11:
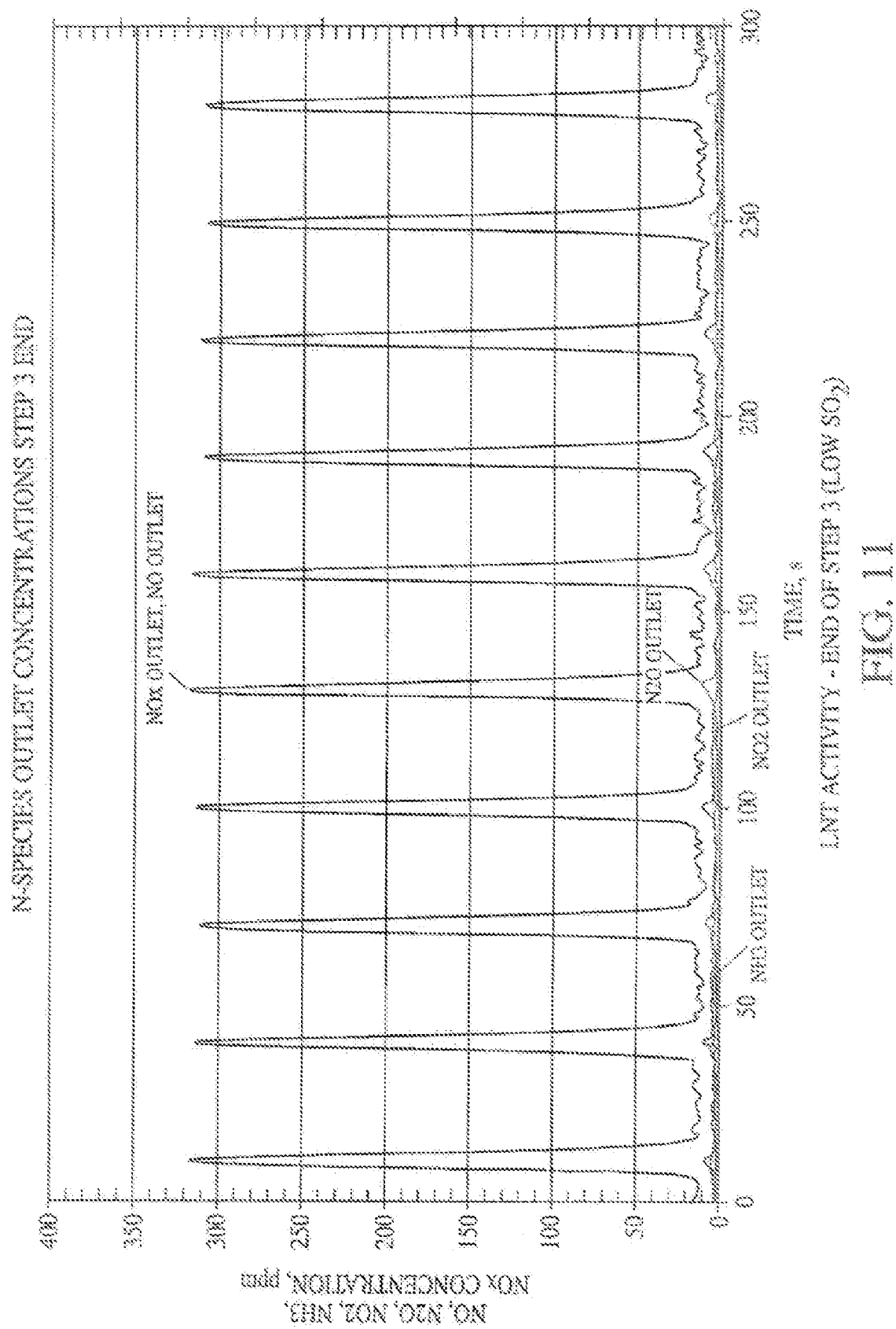
FIG. 11 is a graph illustrating Lean NOx Trap (LNT) activity at the end of Step 3.
Figure 12:
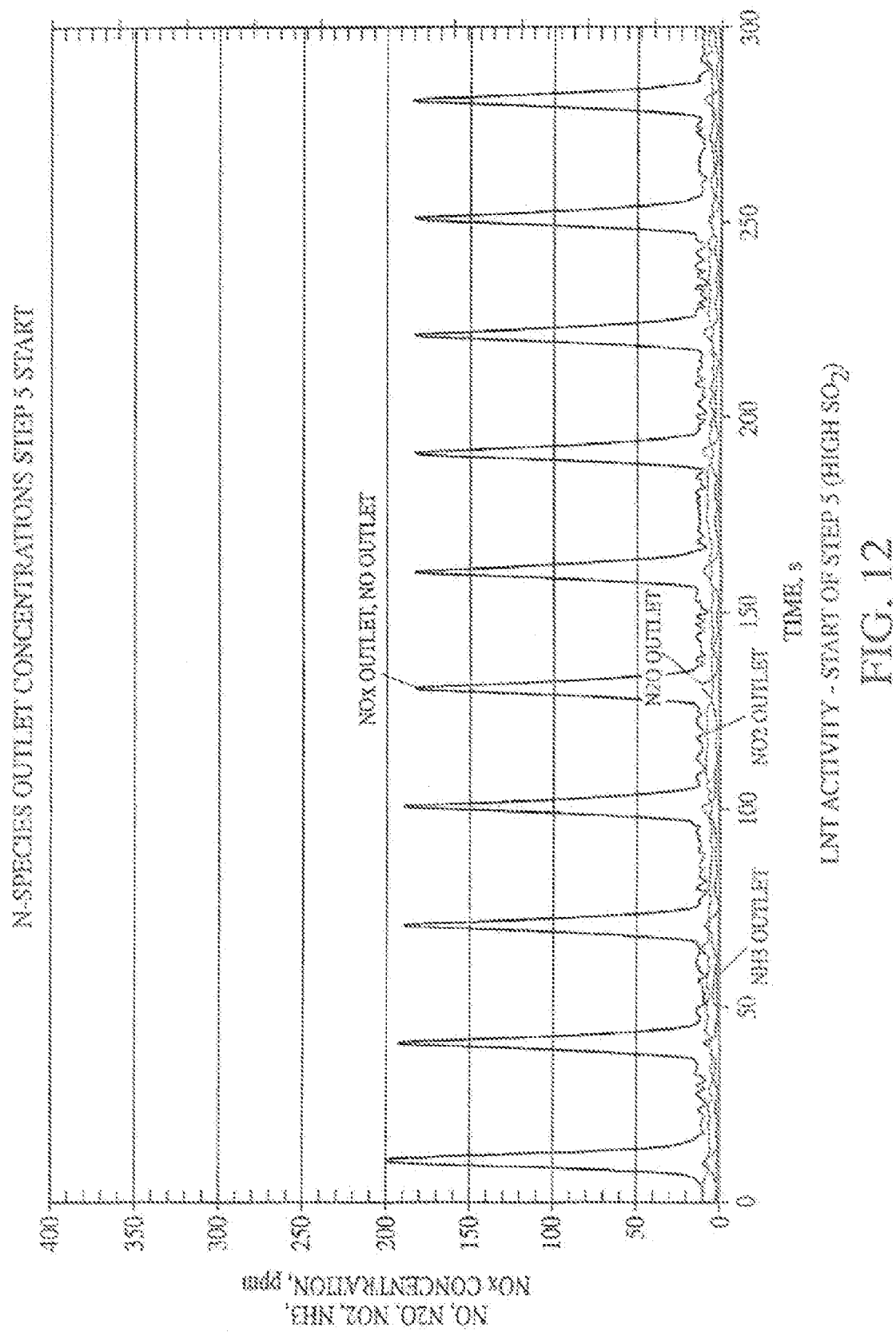
FIG. 12 is a graph illustrating Lean NOx Trap (LNT) activity at the start of Step 5.
Figure 13:
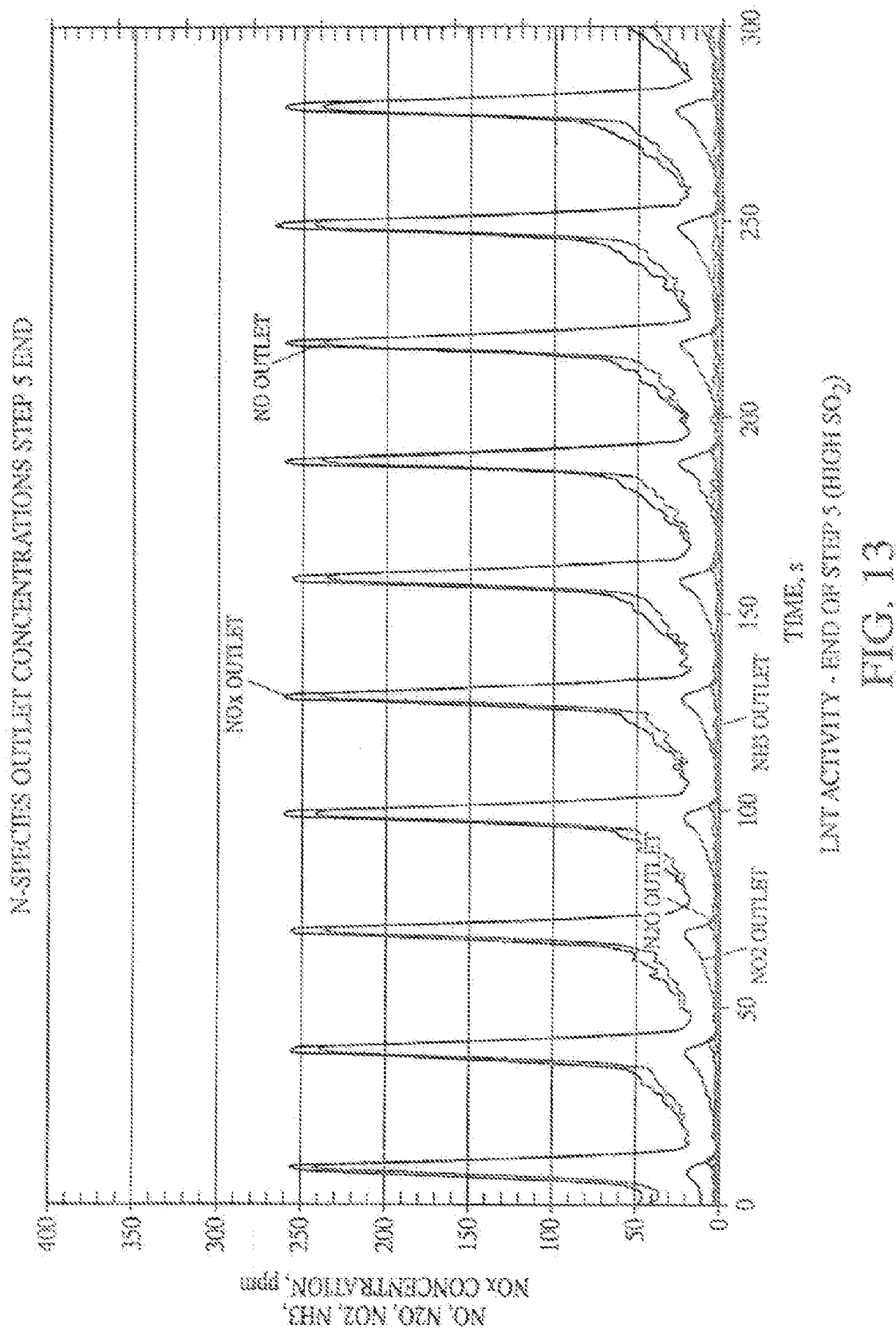
FIG. 13 is a graph illustrating Lean NOx Trap (LNT) activity at the end of Step 5.

FIG. 8 shows the inlet gas concentrations at the start of Step 5 as an example. FIG. 9 show the outlet gas concentrations at the same point in the test sequence. Note the 75 ppm concentration of $SO_2$ at the inlet, but no measurable $SO_2$ at the outlet indicating complete storage on the LNT, or conversion of the $SO_2$ to another form. The lean/rich cycling is also very apparent. Measurements were taken at the start of each hour of normal operation, and again at the end of the hour. FIGS. 10 and 11 show the measured nitrogen-containing species at the start and end of Step 3. Step 3 was a low sulfur (0.6 ppm) step, so no appreciable LNT catalyst deactivation was expected. It is clear that the LNT was performing the same at the end of the hour as it was at the beginning. FIGS. 12 and 13 show the same nitrogen-containing species at the start and end of Step 5. Step 5 was the high sulfur (75 ppm) step, and it was anticipated that catalyst deactivation would be apparent at the end of this step. Appreciable deactivation is apparent from the plots.

Figure 14:
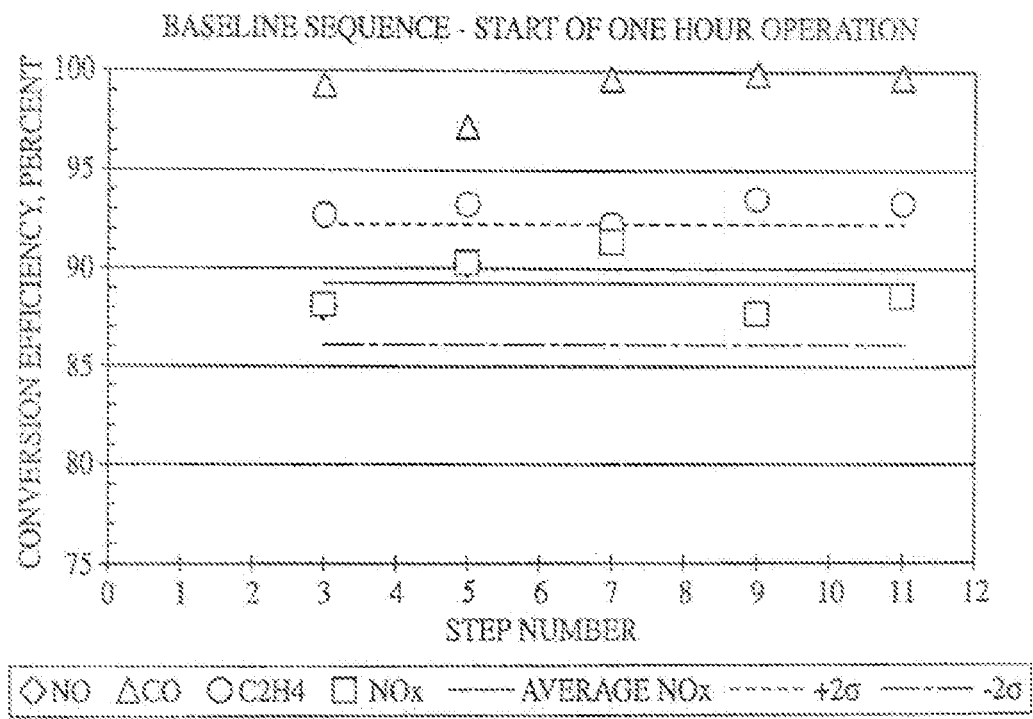
FIG. 14 is a plot of % conversion efficiency vs Step number at the start of normal operation for the baseline test sequence.
Figure 15:
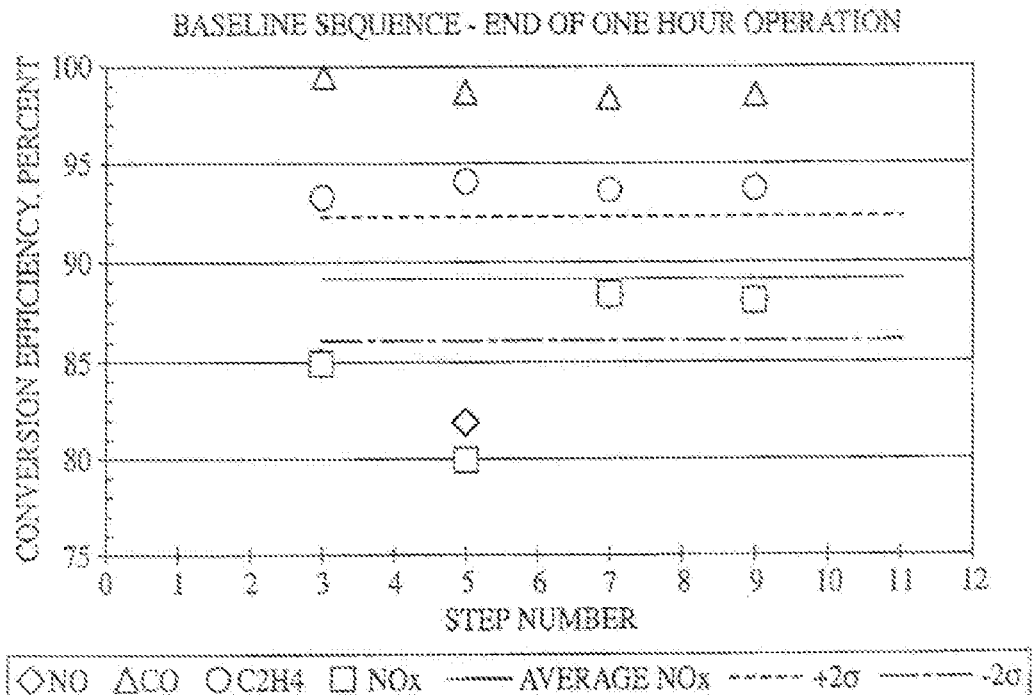
FIG. 15 is a plot of % conversion efficiency vs Step number at the end of normal operation for the baseline test sequence.

FIG. 14 is a summary plot of the conversion efficiencies calculated for NO, $NO_x$, CO, and $C_2H_4$ at the start of each normal operation step. FIG. 15 is a summary plot of the conversion efficiencies calculated for NO, $NO_x$, CO, and $C_2H_4$ at the end of each normal operation step. There is no data for Step 1 as this step began with the 28-second lean/2-second rich cycle times. The average NOx conversion efficiency for all five measured Steps at the start of each hour was calculated. The standard deviation ($\sigma$) was within two percent. The plots show the average start efficiency as well as the calculated $2\sigma$ lines, showing that the catalyst did not deactivate over the course of the baseline sequence. For the end of each Step, it is clear that the high sulfur exposure Step 5 dropped the NOx conversion well below the lower $2\sigma$ line. However, the activity fully recovered after the Step 6 desulfation. Thus, all three goals of the baseline test sequence test were achieved.

The second sequence of tests performed was the high sulfur sequence of Table 2. 0.6 ppm $SO_2$ was used for the normal LNT operation in Steps 1, 3, 7, 9, and 11. 75 ppm $SO_2$ was used for the normal operation in Step 5, and for the first 15 minutes of each 16-minute desulfation. The primary goal of this sequence was to determine if the LNT could be exposed to high sulfur levels during a desulfation, and still maintain NOx reduction during normal operation.

Figure 16:
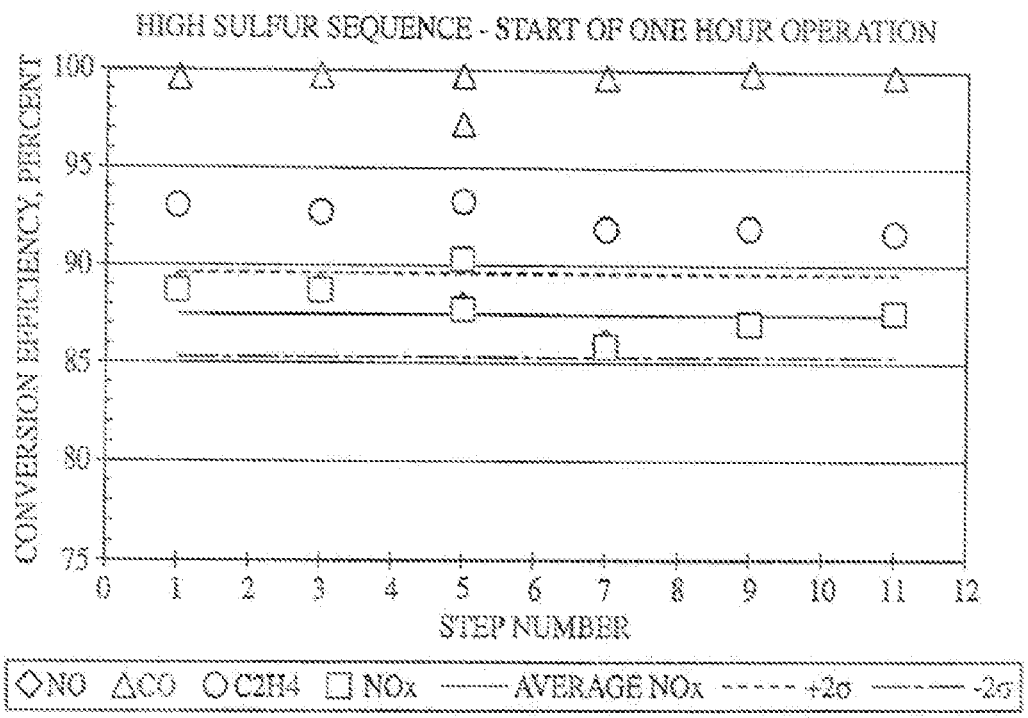
FIG. 16 is a plot of % conversion efficiency vs Step number at the start of normal operation for the high sulfur test sequence.
Figure 17:
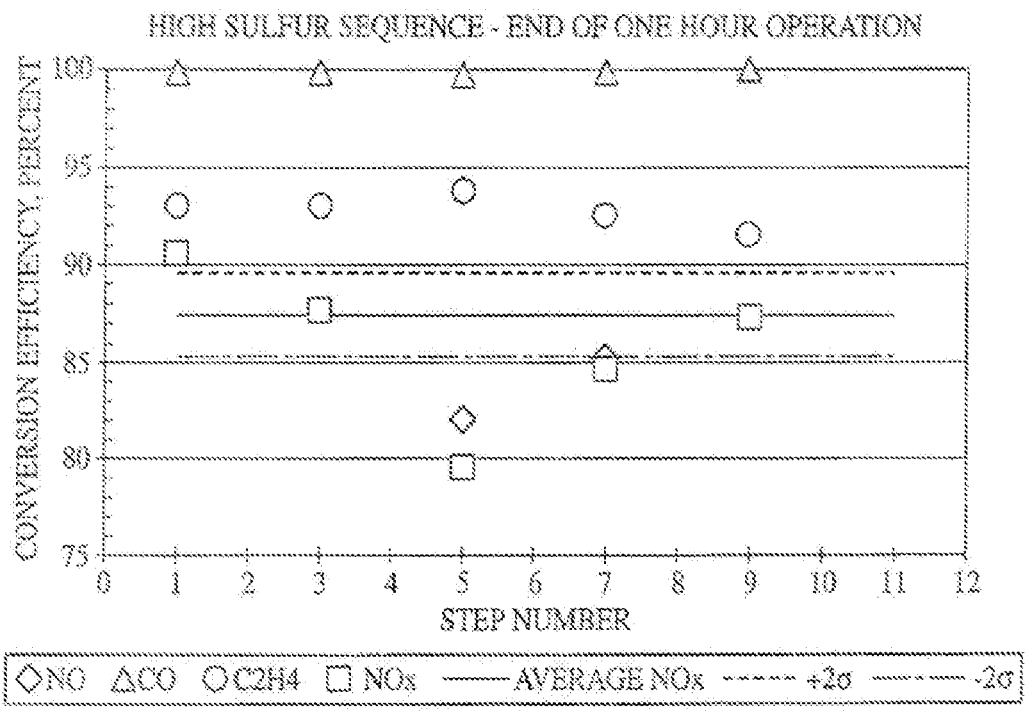
FIG. 17 is a plot of % conversion efficiency vs Step number at the end of normal operation for the high sulfur test sequence.

FIG. 16 is a summary plot of the conversion efficiencies for NO, $NO_x$, CO, and $C_2H_4$ at the start of each normal operation Step. FIG. 17 is a summary plot of the conversion efficiencies for NO, $NO_x$, CO, and $C_2H_4$ at the end of each normal operation Step. As for the baseline test sequence, the standard deviation for the $NO_x$ conversion efficiency for all six measured Steps was well within two percent. As expected, all of the values fall within the $2\sigma$ lines. For the end of each Step it is again clear that the high sulfur exposure Step 5 dropped the $NO_x$ conversion efficiency well below the $2\sigma$ line. The activity recovered by the end of the high sulfur test sequence. Thus, it was established that stored sulfur in the form of sulfur containing compounds could be purged from a fuel filter and injected into an internal combustion engine just before or during desulfation of an emission control device such as an LNT without detriment to the LNT.

What is claimed is:

1. A method for removing a sulfur containing compound from a fuel stream of an internal combustion engine, comprising
   removing a sulfur containing compound from the fuel stream by passing a fuel through a fuel filter capable of removing the sulfur containing compound;
   storing the sulfur containing compound in the fuel filter; and
   releasing a portion of the stored sulfur containing compound into the fuel stream during a regeneration cycle of an emission control device.

2. The method of claim 1 wherein the fuel filter comprises an adsorbent that removes, stores and releases the sulfur-containing compound from the fuel, wherein the portion is released by heating the fuel or the adsorbent to a temperature that will release the sulfur containing compound from the adsorbent.

3. The method of claim 1 wherein the emission control device is a NOx adsorber.

4. The method of claim 3 wherein the regenerative cycle results in the reduction of nitrous oxides.

5. The method of claim 3 wherein the regenerative cycle results in the liberation of sulfur-containing compounds from the emission control device.

6. The method of claim 2 wherein the stored sulfur containing compound is stored in or on the adsorbent.

7. The method of claim 1 wherein the step of releasing a portion of the stored sulfur containing compound comprises heating the adsorbent to a temperature greater than the normal operating temperature of the fuel.

8. The method of claim 7 wherein the adsorbent is heated to a temperature equal to or greater than 100 degree C.

9. The method of claim 7 wherein the adsorbent is heated to a temperature that is less than the boiling point of the fuel.

10. The method of claim 1 wherein the fuel is diesel fuel.

11. A method for removing a sulfur containing compound from a fuel stream of an internal combustion engine, comprising
    removing a sulfur containing compound from the fuel stream by passing a fuel through a fuel filter capable of removing the sulfur containing compound;
    storing the sulfur containing compound in the fuel filter; and
    releasing a portion of the stored sulfur containing compound into the fuel stream during a regeneration cycle of an emission control device, the release of stored sulfur containing compound being synchronized with the regeneration cycle of the emission control device.

12. The method of claim 11 wherein regeneration of the emission control device is based upon reaching a predetermined level of sulfur containing compound within the fuel filter.

13. The method of claim 12 further comprising the step of monitoring levels of sulfur containing compounds within the fuel filter with one or more sensors.

14. The method of claim 13 further comprising the step of transmitting signals from the one or more sensors to a controller based upon levels of sulfur containing compounds within the fuel filter.

15. The method of claim 14 wherein the controller transmits signals to the fuel filter to cause removal of sulfur containing compounds from within the fuel filter once the predetermined level of sulfur containing compound has been reached.

16. The method of claim 15 wherein the controller transmits signals to the emission control device to cause regeneration of the emission control device once the predetermined level of sulfur containing compound has been reached.

17. The method of claim 16 wherein the step of releasing a portion of the stored sulfur containing compound comprises heating an adsorbent of the fuel filter to a temperature greater than a normal operating temperature of the fuel.

18. The method of claim 17 wherein the controller transmits signals to heating elements of the fuel filter and emission control device to cause release of the sulfur containing compounds from the fuel filter and regeneration of the emission control device.

19. The method of claim 18 wherein the adsorbent is heated to a temperature equal to or greater than 100° C.

20. The method of claim 16 wherein the step of releasing a portion of the stored sulfur containing compound comprises heating the fuel to a temperature greater than a normal operating temperature of the same.

* * * * *